United States Patent
O'Malley (10) Patent No.: US 11,496,861 B2
(45) Date of Patent: Nov. 8, 2022

(54) DEVICES FOR USE IN TRACKING USER LOCATIONS DURING GROUP TRAVEL

(71) Applicant: eBay Inc., San Jose, CA (US)

(72) Inventor: Mary O'Malley, San Jose, CA (US)

(73) Assignee: eBay Inc., San Jose, CA (US)

(*) Notice: Subject to any disclaimer, the term of this patent is extended or adjusted under 35 U.S.C. 154(b) by 63 days.

(21) Appl. No.: 17/315,037

(22) Filed: May 7, 2021

(65) Prior Publication Data
US 2021/0266698 A1  Aug. 26, 2021

Related U.S. Application Data

(63) Continuation of application No. 16/906,488, filed on Jun. 19, 2020, now Pat. No. 11,006,240, which is a
(Continued)

(51) Int. Cl.
*H04W 24/00* (2009.01)
*H04W 4/02* (2018.01)
*H04W 4/029* (2018.01)
*H04W 4/42* (2018.01)
*H04W 4/80* (2018.01)
*H04W 68/00* (2009.01)
(Continued)

(52) U.S. Cl.
CPC .......... *H04W 4/023* (2013.01); *H04W 4/029* (2018.02); *H04W 4/40* (2018.02); *H04W 4/42* (2018.02); *H04W 4/80* (2018.02); *H04W 40/244* (2013.01); *H04W 68/005* (2013.01)

(58) Field of Classification Search
CPC ....... H04W 4/023; H04W 4/029; H04W 4/40; H04W 4/42; H04W 4/80; H04W 40/244; H04W 68/005
See application file for complete search history.

(56) References Cited

U.S. PATENT DOCUMENTS 6,057,759 A * 5/2000 Marsh ................ G08B 21/0227
340/572.1
6,502,030 B2 * 12/2002 Hilleary ................ G06Q 10/08
340/992

(Continued)

OTHER PUBLICATIONS

Advisory action received for U.S. Appl. No. 14/582,486, dated Sep. 9, 2016, 4 pages.
(Continued)

*Primary Examiner* — Amancio Gonzalez
(74) *Attorney, Agent, or Firm* — FIG. 1 Patents (57) ABSTRACT

There are provided systems and methods for wireless beacon devices for use in tracking user locations during group travel. A user may take a trip on a vehicle, such as a bus, train, cruise ship, or other large travel vehicle. The users may disembark the vehicle in order to visit a location but plan to travel further on the vehicle. Thus, when the vehicle is attempting to leave the location where the users have left the vehicle, the vehicle may be required to again account for each passenger. The vehicle may utilize a wireless beacon located near an entrance and/or onboard the vehicle to account for each passenger. The wireless beacon may connect to a communication device of each user when the communication device is in proximity to the wireless beacon and, thus, inform the vehicle's operator that each user in located on the vehicle.

20 Claims, 5 Drawing Sheets

Related U.S. Application Data continuation of application No. 16/539,757, filed on Aug. 13, 2019, now Pat. No. 10,728,704, which is a continuation of application No. 16/053,640, filed on Aug. 2, 2018, now Pat. No. 10,405,141, which is a continuation of application No. 15/467,672, filed on Mar. 23, 2017, now Pat. No. 10,104,500, which is a continuation of application No. 14/582,486, filed on Dec. 24, 2014, now Pat. No. 9,641,985.

(51) Int. Cl.
*H04W 40/24* (2009.01)
*H04W 4/40* (2018.01)

(56) References Cited

U.S. PATENT DOCUMENTS

| | | | | |
|---|---|---|---|---|
| 7,283,846 B2* | 10/2007 | Spriestersbach | ........ | H04L 9/40 |
| | | | | 455/566 |
| 8,682,302 B2* | 3/2014 | De Vries | ........ | H04L 67/52 |
| | | | | 455/566 |
| 8,996,036 B2* | 3/2015 | Whipple | ........ | H04W 4/021 |
| | | | | 455/456.4 |
| 9,135,758 B2* | 9/2015 | Giraud | ........ | G07C 5/008 |
| 9,641,985 B2* | 5/2017 | O'Malley | ........ | H04W 4/029 |
| 10,104,500 B2 | 10/2018 | O'Malley | | |
| 10,405,141 B2 | 9/2019 | Malley | | |
| 10,728,704 B2* | 7/2020 | O'Malley | ........ | H04W 4/42 |
| 11,006,240 B2 | 5/2021 | O'Malley | | |
| 2008/0297341 A1* | 12/2008 | McClanahan | ........ | G07C 9/28 |
| | | | | 340/573.6 |
| 2010/0299177 A1* | 11/2010 | Buczkowski | ........ | G06Q 10/06311 |
| | | | | 705/7.13 |
| 2012/0018257 A1* | 1/2012 | Tokura | ........ | B66B 3/006 |
| | | | | 187/387 |
| 2013/0158846 A1* | 6/2013 | Zhang | ........ | G08G 1/127 |
| | | | | 701/117 |
| 2015/0166009 A1* | 6/2015 | Outwater | ........ | B60R 25/302 |
| | | | | 701/2 |
| 2015/0351369 A1* | 12/2015 | Frazier | ........ | A61D 17/00 |
| | | | | 340/573.2 |
| 2016/0055690 A1* | 2/2016 | Raina | ........ | H04W 4/80 |
| | | | | 340/5.61 |
| 2016/0192159 A1 | 6/2016 | O'malley | | |
| 2017/0201862 A1 | 7/2017 | O'malley | | |
| 2017/0303184 A1* | 10/2017 | Todasco | ........ | H04W 76/11 |
| 2018/0343543 A1 | 11/2018 | O'malley | | |
| 2020/0045503 A1 | 2/2020 | O'malley | | |
| 2020/0065722 A1* | 2/2020 | Smith | ........ | H04W 4/023 |
| 2020/0382901 A1 | 12/2020 | O'malley | | |

OTHER PUBLICATIONS

Final office action received for U.S. Appl. No. 14/582,486, dated Jun. 28, 2016, 16 pages.
Non-Final office action received for U.S. Appl. No. 14/582,486, dated Mar. 1, 2016, 17 pages.
Non-Final office action received for U.S. Appl. No. 14/582,486, dated Oct. 19, 2016, 21 pages.
Notice of allowance received for U.S. Appl. No. 14/582,486, dated Feb. 15, 2017, 9 pages.
Corrected Notice of Allowability received for U.S. Appl. No. 15/467,672, dated Sep. 19, 2018, 5 pages.
Non-Final Office Action received for U.S. Appl. No. 15/467,672, dated Dec. 6, 2017, 9 pages.
Notice of Allowance Received for U.S. Appl. No. 15/467,672 dated Apr. 24, 2018, 8 pages.
Non-Final Office Action received for U.S. Appl. No. 16/053,640, dated Jan. 7, 2019, 8 pages.
Notice of Allowance received for U.S. Appl. No. 16/053,640, dated Apr. 19, 2019, 8 pages.
Non Final Office Action Received for U.S. Appl. No. 16/539,757, dated Dec. 11, 2019, 8 pages.
Notice Of Allowance received for U.S. Appl. No. 16/539,757, dated Mar. 18, 2020, 8 pages.
Non Final Office Action Received for U.S. Appl. No. 16/906,488, dated Sep. 16, 2020, 17 pages.
Notice of Allowance Received for U.S. Appl. No. 16/906,488, dated Jan. 12, 2021, 10 Pages.
Stack Overflow,"Open the Android App Automatically Based on the Current Location or on receiving Push Notification", Accesses on Aug. 18, 2020, 2 pages.

* cited by examiner

DEVICES FOR USE IN TRACKING USER LOCATIONS DURING GROUP TRAVEL

CROSS REFERENCE TO RELATED APPLICATIONS

This application is a continuation of U.S. patent application Ser. No. 16/906,488, filed on Jun. 19, 2020 which is a continuation application of U.S. patent application Ser. No. 16/539,757, filed on Aug. 13, 2019, now U.S. Pat. No. 10,728,704, which is a continuation of U.S. Patent Application Ser. No. 16/053,640, filed on Aug. 2, 2018, now U.S. Pat. No. 10,405,141, which is a continuation of U.S. patent application Ser. No. 15/467,672, filed on Mar. 23, 2017, now U.S. Pat. No. 10,104,500, which is a continuation of U.S. patent application Ser. No. 14/582,486, filed on Dec. 24, 2014, now U.S. Pat. No. 9,641,985. The entire contents of each of these applications are incorporated herein by reference.

TECHNICAL FIELD

The present application generally relates to wireless beacon devices for use in tracking user locations during group travel and more specifically to using a connection between a communication device in possession of s user and a wireless beacon located on or nearby a travel vehicle to determine if the user is located on the travel vehicle.

BACKGROUND

A user, such as a traveler or vacationer, may take a trip using a vehicle, such as a bus, train, airplane, boat, or other sub-types of vehicle, such as cruise ships and limousines. While travelling on the vehicle, the vehicle may make stops, where one or more users may disembark the vehicle, for example, to visit the location the vehicle has stopped, purchase goods at the location, and/or to end the user's trip on the vehicle. The vehicle may have plans to continue travelling to another destination with one or more of the users who have left the vehicle at the location. The vehicle may set a time where every user should return to the vehicle. However, some users may lose track of time or become lost at the location and not know when or how to return to the vehicle. Thus, the vehicle runs the risk of either leaving passengers or deviating from a planned schedule. Moreover, the user may return to the vehicle but be unaccounted for by the vehicle's operator, for example, if they have return to a room without checking in with a vehicle attendant. Thus, the vehicle may be unaware when all the users return to the vehicle and the vehicle is ready for departure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized by wireless beacon devices for use in tracking user locations during group travel. Systems suitable for practicing methods of the present disclosure are also provided.

A vehicle, such as a bus, a subway, a train, a boat, a cruise ship, an airplane, and/or a limousine may provide short range wireless communications with users' communication devices, such as through beacons using Bluetooth Low Energy (BLE), LTE Direct, or other communication protocol. These beacons may be set up at an entrance (e.g., door, boarding location, etc.) and/or located on/within the vehicle. The beacons may communicate with devices in possession of users in order to connect to the device and determine the user is in proximity to the beacon. The beacons may provide additional functionality, such as establishing a connection with a vehicle device or server to provide the vehicle device/server notifications that the user is detected on the vehicle, and, in certain embodiments, where the user is located within the vehicle. Thus, the beacons may provide proximity detection of users and triangulation of users' positions/locations within the vehicle.

Thus, these beacons associated with the vehicle may communicate with the communication device in possession of the user through Bluetooth Low Energy (BLE), LTE Direct, or another communication protocol receivable by the communication device. When establishing a connection, the beacon may emit a communication signal including an identifier for the beacon, the vehicle, and/or an operator of the vehicle. A connection module of the communication device may execute specialized hardware and/or software to passively monitor for the short range wireless communications, for example, through a communication module. When the device detects the signal and verifies the one or more identifiers, both the device and the beacon may ramp up in power and establish a connection, where the connection may further enable the device to communicate additional information to the wireless beacon, such as connection information (e.g., an identifier) and/or other stored data (e.g., a ticket, itinerary, or other travel information). The beacon may be connected to a networked device on or associated with the vehicle (e.g., a center console computing unit, a heads up display, a tablet computer, a wearable computing device, and/or a centralized vehicle computing device), or the beacon may include network functionality to communicate with other devices and/or servers itself.

Thus, the beacon enables the communication device to establish a connection, communicate connection information (e.g., an identifier for the user and/or communication device), and/or complete a check-in for the vehicle. Once the wireless beacon receives the connection information for the user, the wireless beacon may communicate the connection information to a vehicle device/server for use in determining whether all users travelling on the vehicle are located on vehicle. In certain embodiments, the connection information may include information necessary to determine or access itinerary and/or identification information for the user, such as a ticket, ticket number, cabin number, name, address, etc.

The vehicle device/server may access a travel log of users (e.g., passengers) on the vehicle. The travel log may include identifiers or other identification information for each passenger that should be travelling on the vehicle. The vehicle device/server may then determine which users are on the vehicle using connection information for which communication devices have connected to a wireless beacon associated with the vehicle. For example, the connection information may correspond to the connections between the communication devices and the wireless beacon, such as which identifiers for the users have been communicated to the wireless beacon and thereby the vehicle device/server. If a user in the passenger list has a communication device that has recently (e.g., within a time frame after the user has disembarked the vehicle) connected to the wireless beacon and communicated an identifier to the wireless beacon, the user may be determined to be located on the vehicle through the connection information and the travel log. However, if a user in the travel log has not had their communication device connect to the wireless beacon (e.g., when the user attempts to re-enter the vehicle) within that time frame, the user may be determined to still be located remotely from the vehicle.

If all users in the travel log are detected on the vehicle through connections between their communication devices and the wireless beacon associated with the vehicle, an operator of the vehicle may be notified that all users have returned. Thus, the operator may continue travel of the vehicle to further destinations. The operator of the vehicle may be alerted on a device, such as a center console computing unit, a heads up display, a tablet computer, a wearable computing device, and/or a centralized vehicle computing device. However, where one or more users' communication devices have not connected to the wireless beacon and provided connection information (e.g., an identifier) to the wireless beacon, the operator may be notified that one or more users is not located on or within the vehicle. The vehicle's device/server may determine communication information for the user(s) and may alert the user(s) that the vehicle is or plans to depart. The alert may include one or more of an SMS or MMS text message to a phone number in the contact information, an email to an email address in the contact information, a message to a messenger account in the contact information, and/or a phone call to the phone number. Additionally, the wireless beacon may connect with a communication device for a user that is not registered to be one the vehicle in the travel log (e.g., a passenger on the wrong vehicle or attempting to travel without purchasing fare/tickets). The vehicle's device/server may alert the unregistered passenger on their communication device of the error. Additionally, the operator or other administrator of the vehicle may be alerted to remove the passenger.

The operator of the vehicle may also be given the communication information to alert the user. The operator may be given a missing passengers list that includes all users who have failed to check back in to the vehicle through their communication device connecting with the wireless beacon. The missing passengers list may include the contact information for each user, as well as co-passengers associated with the user and/or emergency contacts. The missing passengers list may also be updated if the user re-enters the vehicle and their communication device connects with the vehicle's wireless beacon. The vehicle's device/server may also access an itinerary of the user to determine if the user is departing at that location, and may remove the missing user's name from the missing passengers list if required. Moreover, the vehicle's device may contact one or more of an emergency contact associated with the at least second passenger, an authority department contact, a vehicle security officer contact, and/or a co-passenger contact associated with the at least second passenger to alert them of the missing user. If the passenger misses the vehicle (e.g., does not return in time), the passenger may be informed of the next arrival and arrival time of another vehicle that may transport the passenger to their destination. The passenger may also be informed of the next stop for the departed vehicle so that the passenger may arrange travel to meet at the next connection location for the vehicle. Purchasable fare and/or tickets may also be provided to the passenger so that the passenger may purchase travel to their destination.

Figure 1:
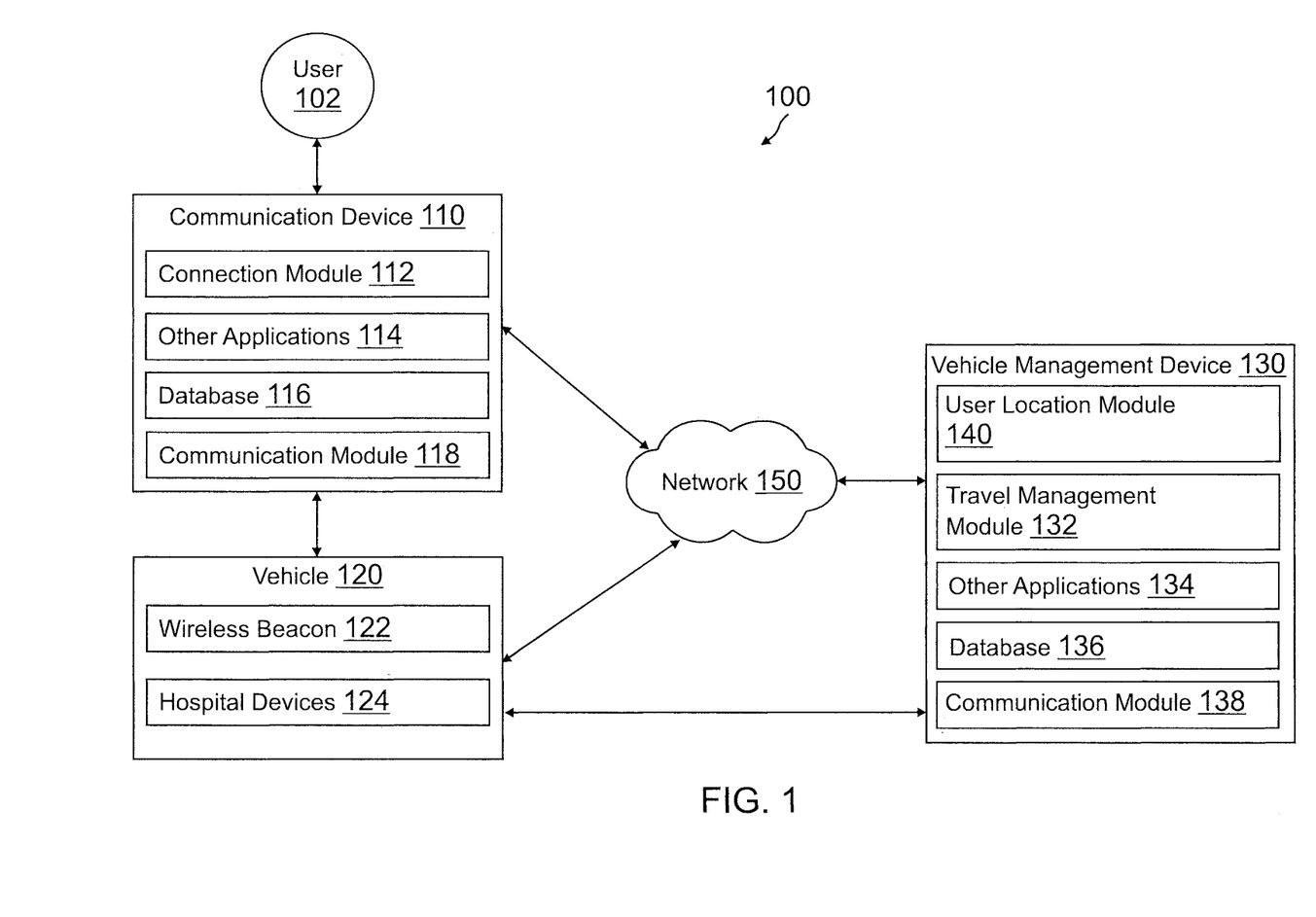
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a communication device 110, a vehicle 120 having a wireless beacon 122 and an operator device 124, and a vehicle management device 130 in communication over a network 150. User 102 may travel in vehicle 120 with communication device 110. User 102 may at some point exit vehicle 120 at a location. When an operator of vehicle 120 wishes to leave the location, the operator may determine whether user 102 is located on the vehicle or not. If user 102 re-enters the vehicle, communication device 110 may connect with wireless beacon 122, where vehicle management device 130 receives information for the connection and alerts the operator that user 102 has re-entered the vehicle through operator device 124. However, if user 102 is not located on the vehicle and/or has not re-entered the vehicle wireless beacon 122 may not receive connection information from communication device 110, and vehicle management device 130 may determine that user 102 is not located on the vehicle. Thus, vehicle management device 130 may alert the operator that user 102 is not located on the vehicle through operator device 124.

Communication device 110, wireless beacon 122, operator device 124, and vehicle management device 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with wireless beacon 122, operator device 124, and/or vehicle management device 130. For example, in one embodiment, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a connection module 112, other applications 114, a database 116, and a communication module 118. Connection module 112 and other applications 114 may correspond to executable processes, procedures, and/or applications with associated hardware. In other embodiments, communication device 110 may include additional or different hardware and software as required.

Connection module 112 may correspond to one or more processes to execute modules and associated devices of communication device 110 to establish a connection with wireless beacon 122, including a check-in with vehicle 120 that identifies user 102 as being located on or within vehicle 120. In this regard, connection module 112 may correspond to specialized hardware and/or software utilized by communication device 110 with wireless beacon 122 to establish a connection and complete a connection with wireless beacon 122 to establish connection information for communication device 110 with wireless beacon 122, which may be utilized by vehicle management device 130 to determine that user 102 is located on vehicle 120. A connection by connection module 112 with one or more of wireless beacon 122 may provide and/or verify the identity of user 102, including transmission of an identifier for user 102 and/or communication device 110, or other information used to process a connection for communication device 110 and a check-in for user 102. Thus, connection information may be established when a connection is made by connection module 112 with wireless beacon 122.

In various embodiments, connection module 112 receives short range wireless communications from wireless beacon 122 through communication module 118 at vehicle 120 and transmits information to wireless beacon 122, including connection information for a check-in process that associates user 102 with wireless beacon 122 connected with communication device 110. For example, wireless beacon 122 may be located at an entrance, on, and/or within vehicle 120 and set up to communicate with communication device 110 when communication device 110 is in proximity to wireless beacon 122. Thus, wireless beacon 122 may be range limited to connect only with devices (e.g., communication device 110) within the specified area, such as a radius around wireless beacon 122, a distance away from wireless beacon 122, and/or a signal direction for wireless beacon 122. When communication device 110 enters the proximity radius for one or more of wireless beacon 122, communication device 110 and wireless beacon 122 may connect and connection information including an identifier for user 102 and/or communication device 110 may be transmitted to wireless beacon 122.

Connection module 112 may execute in the background of an operating system of communication device 110 and be configured to establish connections, using communication module 118 of communication device 110, with wireless beacon 122. The connection may be established with or without user input from user 102. For example, wireless beacon 122 may broadcast a token, such as a universally unique identifier (UUID), for reception by connection module 112, as explained herein. Connection module 112 may utilize communication module 118 of communication device 110 to receive the token from wireless beacon 122. If connection module 112 acknowledges the UUID as identifying vehicle 120, wireless beacon 122, operator device 124, and/or vehicle management device 130 (e.g., if connection module 112 determines the UUID corresponds to a request to establish a communication channel and/or process and complete a check-in), connection module 112 may transmit an identifier corresponding to user 102 and/or communication device 110 back to wireless beacon 122. Connection module 112 may utilize communication module 118 of communication device 110 to communicate with wireless beacon 122 (e.g., over near field communication, Bluetooth, Bluetooth Low Energy, radio, infrared, LTE Direct, or other communication protocol). The identifier from communication device 110 may include, be transmitted with, concatenated with, or otherwise bundled with the identifier received from wireless beacon 122. In other embodiments, different information may be transmitted to wireless beacon 122, such as a name or other personal information for user 102, an itinerary, travel schedule, ticket, or other identifying information. Thus, the information transmitted to wireless beacon 122 does not need to be utilized to process and/or complete a check-in with vehicle 120 in all embodiments. Instead, the connection information may be sufficient to determine user 102 is located on vehicle 120.

Once a connection is established with wireless beacon 122, the process may associate user 102 with wireless beacon 122 used to connect to communication device 110, and, thus, vehicle 120. For example, wireless beacon 122 may previous be registered as located at an entrance, on, and/or within vehicle 120. Once communication device 110 connects to one or more of wireless beacon 122, the connection information for the connection (e.g., the connection information including an identifier and information for the check-in, such as the beacon(s) of wireless beacon 122 that communication device 110 is connected to) may be transmitted to vehicle management device 130 for processing. Vehicle management device 130 may process the connection information to determine user 102 is located on the vehicle, as discussed herein. However, absent connection information for user 102/communication device 110, vehicle management device 130 may determine that user 102 is not located on the vehicle.

Once a connection is established with wireless beacon 122 by connection module 112, connection module 112 may be utilized to transmit further information to wireless beacon 122 for use by vehicle management device 130. For example, connection module 112 may access information stored to database 116, such as user personal, financial, and/or travel information. Such information may be transmitted to vehicle management device 130 for processing to determine user 102's itinerary, destination, or other travel information. Connection module 112 may also interface with one or more APIs for applications and/or modules executed by communication device 110 to retrieve such information. Connection module 112 may also access contacts of user 102, such as co-passengers and/or emergency contacts, which may be provided to vehicle management device 130. In other embodiments, vehicle management device 130 may receive such contacts prior to or when user 102 embarks on travel with vehicle 120.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. In various embodiments, other applications 114 may be utilized to receive notifications and/or alerts from one or more of operator device 124 and/or vehicle management device 130. Such notifications and/or alerts may correspond to information about an imminent departure of vehicle 120, a departure of vehicle 120, and/or a departure time for vehicle 120. The notifications/alerts may be received if user 102 is not detected as located on vehicle 120. The notifications/alerts may correspond to one or more of an SMS or MMS text message to a phone number in the contact information, an email to an email address in the contact information, a message to a messenger account in the contact information, and/or a phone call to the phone number. Messages received by communication device 110 may also correspond to alerts that user 102 is on an incorrect vehicle if a travel log for vehicle 120 does not include user 102. Additionally, other applications 114 may include applications to present a next connection for vehicle 120 if user 102 misses a departure of vehicle 120 from a location, as well as an application to purchase travel fare/tickets on another transportation provided if user 102 misses vehicle 120's departure.

In various embodiments, other applications 114 may include financial applications, such as banking, online payments, money transfer, or other applications associated with a payment provider. As previously discussed, other applications may include mapping applications, social networking applications, and/or vehicle/travel applications (e.g., an application including information for vehicle 102's travel route, times, prices, etc.). Other applications 114 may include device interfaces and other display modules that may receive input from user 102 and/or output information to user 102. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with connection module 112 and/or other applications 114, identifiers associated with hardware of communication device 110, or other appropriate identifiers, such as identifiers used for payment/user/device authentication or identification. Database 116 may include additional information communicated to wireless beacon 122, operator device 124, and/or vehicle management device 130, such as contact information for co-passengers and emergency contacts, itineraries and other travel information, and/or tickets for user 102.

Communication device 110 includes at least one communication module 118 adapted to communicate with wireless beacon 122, operator device 124, and/or vehicle management device 130. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacon 122 using short range communications, such as Bluetooth Low Energy, LTE Direct, WiFi, radio frequency, infrared, Bluetooth, and near field communications.

Vehicle 120 may correspond to a passenger carry used for transporting one or more users between two or more points. Vehicle 120 may correspond to a small or large passenger conveyance, such as a car, truck, bus, train, boat, cruise ship, airplane, or other type of vehicle that a user may utilize while travelling between locations. Vehicle 120 may stop at one or more locations between a starting point and a destination point, where vehicle 120 may allow passengers to disembark from vehicle 120. Vehicle 120 may be required to pick up one or more of the passengers that disembarked in order to continue transporting the passengers to a further location or the destination point. Although only one vehicle is shown, a plurality of vehicles may include similar devices that function similarly. Additionally, vehicle management device 130 may be associated with only vehicle 120 or may be associated with a plurality of vehicles (e.g., where vehicle management device 130 corresponds to a server).

Vehicle 120 of FIG. 1 further includes wireless beacon 122 and operator device 124. Wireless beacon 122 and operator device 124 may include hardware and software necessary to execute the processes and functions as described below. In other embodiments, vehicle 120 may include devices, servers, displays, mechanisms, hardware, and/or software as required.

Wireless beacon 122 may be maintained, for example, by an operator and/or administrator of vehicle 120 and/or vehicle management device 130. Wireless beacon 122 may be implemented using any appropriate hardware and software configured for wireless communication with communication device 110. For example, in one embodiment, wireless beacon 122 may be implemented as a dongle device including a hardware processor and a communication module, for example, attached to, connected with, and/or corresponding to vehicle 120. Wireless beacon 122 may also be implemented as devices incorporated within a personal computer (PC), a smart phone, laptop computer, and/or other types of computing devices capable of transmitting and/or receiving data, such as an IPAD® from APPLE®. Wireless beacon 122 may also act as a stand-alone device including a processor, communication module, and/or network interface component configured to communicate with communication device 110 and/or vehicle management device 130. Although wireless beacon 122 is described singly, a plurality of wireless beacons may correspond to vehicle 120, which may function similarly.

Wireless beacon 122 may be located within, on, near, or corresponding to vehicle 120. Wireless beacon 122 may be limited, either by signal range or physical properties of vehicle 120/wireless beacon 124, to connect to device 110 only when device 110 is within a certain distance range of vehicle 120. For example, wireless beacons 122 may only connect to communication device 110 within vehicle 120. In various embodiments, wireless beacon 122 may be located within a sub-area/location of vehicle 120 and configured to only connect to devices within the sub-area/location (e.g., an entrance). Thus, wireless beacon 122 may be associated with the sub-area/location such that when device 110 connects with wireless beacon 122, communication device 110 may be associated with the area (e.g., entrance location).

Wireless beacon 122 of FIG. 1 contains processes, procedures, and/or applications executable by a hardware processor, for example, a software program, configured to interact with communication device 110 and/or vehicle management device 130. Thus, regardless of the implementation of wireless beacon 122 as discussed above, wireless beacon 122 may utilize a connection/check-in process and include or be connected to a communication module. In other embodiments, wireless beacon 122 may include additional or different hardware and software as required.

Wireless beacon 122 may include an application for transmitting requests to establish a connection between a device (e.g., communication device 110) and wireless beacon 122. The requests may be unique to wireless beacon 122, thereby identifying wireless beacon 122. Wireless beacon 122 may utilize short range wireless communications of wireless beacon 122 to transmit the requests to establish a connection, including an identifier such as a Universally Unique Identifier (UUID). If communication device 110 receives a request to establish the connection with wireless beacon 122 and responds with an identifier for user 102 and/or communication device 110 (potentially including the UUID and other information necessary to identify the aforementioned user/item/device), wireless beacon 122 to ramp up in power and create a connection between communication device 110 and wireless beacon 122.

Wireless beacon 122 may transmit the request to establish the connection with wireless beacon 122 as a short range wireless communication (e.g. a BLE protocol communication) including a "wake up" process for communication application 112 of device 110 and/or a token for wireless beacon 122 transmitting the request. In other embodiments, the request and/or connection may utilize near field communication, radio communication, infrared communication, or Bluetooth communication. Additionally, although wireless beacon 122 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacon 122 (e.g., communication device 110) and establishment of a connection for data transfers. In other embodiments, wireless beacon 122 may correspond to other devices, such as WiFi capable devices, near field communication devices, etc.

The request may be specific to communication device 110 by including information that is specific to user 102 and/or communication device 110, such as a name, identifier, or device identifier. The information specific to user 102 may be determined from information previously provided to vehicle management device 130, such as a name, identifier, travel itinerary, ticket, etc. Thus, in certain embodiments, only communication device 110 will pick up and authenticate the request. In other embodiments, only communication device 110 may pick up the request if wireless beacon 122 is range limited to only transmit the request to devices within a certain proximity to sub-areas/locations within vehicle 120.

After wireless beacon 122 receives connection information (e.g., an identifier) from communication device 110, wireless beacon 122 may determine device 110 is in proximity to wireless beacon 122 and thus vehicle 120. Wireless beacon 122 may pass the connection information to vehicle management device 130 to associate communication device 110 with the wireless beacon 122, and thus, the location for wireless beacon 122. Vehicle management device 130 may then determine user 102 is located on vehicle 120 and may determine if any other passengers are missing from vehicle 120 based on lack of connection information for those passengers, as discussed herein.

Wireless beacon 122 may utilize a communication module to pass the check-in information received from device 110 to operator device 124, which may also pass the check-in information to vehicle management device 130. However, in other embodiments, wireless beacon 122 may utilize a network connection of wireless beacon 122 to pass the check-in information to vehicle management device 130 directly. Thus, wireless beacon 122 includes a communication module adapted to communicate with communication device 110, operator device 124, and/or vehicle management device 130. The communication module may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. The communication module of wireless beacon 122 may also communicate with communication device 110 and/or vehicle management device 130 using short range communications, such as Bluetooth Low Energy, LTE Direct, WiFi, radio frequency, infrared, Bluetooth, and near field communications (e.g., if vehicle management device 130 is local to vehicle 120).

Operator device 124 may be maintained, for example, by an operator, owner, or other entity associated with vehicle 120 and/or vehicle management device 130. In this regard, operator device 124 may include one or more processing applications which may be configured to interact with communication device 110 and/or vehicle management device 130 to receive information about whether all passengers are located on vehicle 120, an alert that a passenger is missing from vehicle 120, receive a missing passenger list of missing passengers, receive updates when missing passenger board vehicle 120, and/or receive contact information to alert one or more entities that a passenger is missing from vehicle 120. For example, operator device 124 may display such information to a driver, boarding attendant, or other user that may account for all passengers on vehicle 120. Thus, operator device 124 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. In various embodiments, operator device 124 may take the form of a center console computing unit, a heads up display, and/or a centralized vehicle computing device. Moreover, in various embodiments, one or more of the applications, processes, and/or features discussed below in reference to vehicle management device 130 may be included in one or more of operator device 124 (e.g., user location module 140).

Vehicle management device 130 may be implemented as a computing device that may utilize appropriate hardware and software configured for wired and/or wireless communication with communication device 110, wireless beacon 122, and/or operator device 124. Vehicle management device 130 may be utilized determine whether passengers are located on vehicle 120 using connection information for each passengers communication device and wireless beacon 122. For example, in one embodiment, vehicle management device 130 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a device is shown, the device may be managed or controlled by any suitable processing device. Although only one vehicle management device is shown, a plurality of vehicle management devices may function similarly.

Vehicle management device 130 of FIG. 1 contains a user location module 140, a travel management module 132, other applications 134, a database 136, and a communication module 138. User location module 140, travel management module 132, and other applications 134 may correspond to executable processes, procedures, and/or applications with associated hardware. In other embodiments, vehicle management device 130 may include additional or different hardware and software as required.

User location module 140 may correspond to one or more processes to execute modules and associated devices of vehicle management device 130 to access travel log information for passengers travelling on vehicle 120 and determine whether one or more passenger is not located on vehicle 120 when vehicle 120 is preparing to or departing from a location. In this regard, user location module 140 may correspond to specialized hardware and/or software that may first access a travel log for vehicle 120, for example, from database 136. The travel log may include required passengers to be boarded on vehicle 120 when vehicle 120 leaves a location that vehicle 120 is currently residing. The travel log may include passenger information for each passenger, including a name, identifier, device identifier, itinerary, and/or ticket information. The travel log may be entered, determined, and/or maintained by travel management module 132, as explained herein. The travel log may also be updated by travel management module 132 to remove and/or add passengers that leave or board, respectively, vehicle 120 at the location, as explained herein.

While vehicle 120 is residing at a location, one or more users (passengers) may exit from vehicle 120, for example, to view a port on a cruise ship, to shop or stretch at a layover airport, or for another reason. Additionally, vehicle 120 may pick up new passengers at the location. Before vehicle 120 leaves the location, the operator and/or management/administrator of vehicle 120 may be required to account for all passengers and have all passengers enter and/or re-enter vehicle 120 for transportation to a further location. Thus, user location module 140 may determine if all passengers have entered/re-entered vehicle 120 using connection information received from wireless beacon 122. The connection information may be generated based on a connection between communication device 110 and wireless beacon 122, and may include an identifier for user 102 and/or communication device 122. On receiving the connection information for wireless beacon 122 when communication device 110 and wireless beacon 122 connect, user location module 140 may determine that user 102 in now located on or nearby vehicle 120 and ready for transport to the next location. Once every passenger is detected as on, within, or nearby vehicle 120 based on a connection for each passenger (e.g., a connection between each passengers' communication device and wireless beacon 122), user location module 140 may determine that all passengers are ready for travel on vehicle 120. Thus, an operator of the vehicle may be updated that vehicle 120 is ready to disembark, such as through operator device 124.

However, if one or more of the passengers has not generated connection information, user location module 140 may determine that the user is not located on vehicle 120. For example, if user 102 is located remotely from vehicle 120 (e.g., not located on, within, or nearby, and thus not ready to travel on vehicle 120), the connection for user 102's communication device 110 and wireless beacon 122 may not be generated. Thus, connection information for wireless beacon 124 may not include a connection between communication device 110 and wireless beacon 122. In such embodiments, user location module 140 may determine that not all passengers are located on vehicle 120, and may update the operator of vehicle 120 that vehicle 120 is not ready to leave, such as through operator device 124. The operator may further receive user 102's personal and/or contact information on operator device 124 in order to alert user 102 of vehicle 120's upcoming or current departure and/or a departure time. In various embodiments, user location module 140 may access the contact information for user 102 from database 136. User location module 140 may also contact user 102, such as through a SMS/MMS text, a messaging application, an email, and/or a phone call that alerts user 102 that vehicle 120 is missing user 102 and/or departure information for user 102. Additionally, an emergency contact associated with user 102, an authority department contact, a vehicle security officer contact, and a co-passenger contact associated with user 102 may be alerted in order to determine a location of user 102 and/or notify user 102.

In various embodiments, user location module 124 may also determine that user 102 is not on a travel log for vehicle 120, for example, if user 102 is on the wrong vehicle and/or is attempting to travel without purchasing fare/tickets. Thus, user location module 140 may alert user 102 through communication device 110 of user 102's error. An operator or other party may also be alerted through operator device 124 in order to remove user 102 if necessary. If user 102 misses a departure of vehicle 120 from a location, user location module 140 may determine information necessary for user 102 to arrive at their destination. Such information may include the next connection for vehicle 120 so that user 102 may arrange personal travel to reach the connection and rejoin vehicle 120. In other embodiments, user location module may also determine tickets or fare with one or more other vehicles and/or transportation providers, which may be communicated to user 102 through communication device 110 so that user 102 may purchase travel arrangements to arrive at their destination.

Travel management module 132 may correspond to one or more processes to execute modules and associated devices of vehicle management device 130 to receive, determine, and/or modify one or more travel logs for vehicle 120 as well as receive and process itineraries and boarding tickets or travel fares for one or more passengers of vehicle 120 (e.g., user 102). In this regard, travel management module 132 may correspond to specialized hardware and/or software utilized by vehicle management device 130 that may receive a travel log, such as by a management/administrative entity of vehicle 120. In other embodiments, travel management module 132 may determine a travel log using itinerary, boarding tickets, travel fares, and/or other travel information for passengers of vehicle 120. Travel management module 132 may store the travel log(s) (as well as any information for user 102 and/or other passengers of vehicle 120) to database 136 for user by user location module 140.

In various embodiments, one or more features of travel management module 132 and/or user location module 140 may be incorporated in the same module so as to provide their respective features in specialized hardware and/or software of one module.

In various embodiments, vehicle management device 130 includes other applications 134 as may be desired in particular embodiments to provide features to vehicle management device 130. For example, other applications 134 may include security applications for implementing client-side security features, programmatic client applications for interfacing with appropriate application programming interfaces (APIs) over network 170, or other types of applications. Other applications 134 may also include email, texting, voice and IM applications that allow an operator of vehicle 120 to send and receive emails, calls, texts, and other notifications through network 150, such as notifications/alerts to user 102 through communication device 110. As previously discussed, other applications may include mapping, travel, calendaring/scheduling, Internet browser applications, or other applications, which, for example, may be utilized to determine a location of user 104. Other applications 134 may include device interfaces and other display modules that may receive input and/or output information. For example, other applications 134 may contain software programs, executable by a processor, including a graphical user interface (GUI) configured to provide an interface to the use.

Vehicle management device 130 may further include database 136 stored to a transitory and/or non-transitory memory of vehicle management device 130, which may store various applications and data and be utilized during execution of various modules of vehicle management device 130. Thus, database 136 may include, for example, identifiers such as operating system registry entries, cookies associated with user location module 140, travel management module 132, and/or other applications 134, identifiers associated with hardware of vehicle management device 130, or other appropriate identifiers, such as identifiers used for payment/user/device authentication or identification. Database 136 may include travel logs for vehicle 120 and connection information for wireless beacon 122. Information for user 102 and/or other passengers of vehicle 120 may be stored to database 136, such as itineraries, boarding tickets, paid fares, contacts (e.g., co-passengers and/or emergency contacts), and/or contact information.

Vehicle management device 130 includes at least one communication module 138 adapted to communicate with communication device 110, wireless beacon 122, and/or operator device 124. In various embodiments, communication module 138 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 138 may communicate directly with wireless beacon 122 and/or operator device 124 using short range communications, such as Bluetooth Low Energy, LTE Direct, WiFi, radio frequency, infrared, Bluetooth, and near field communications.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2:
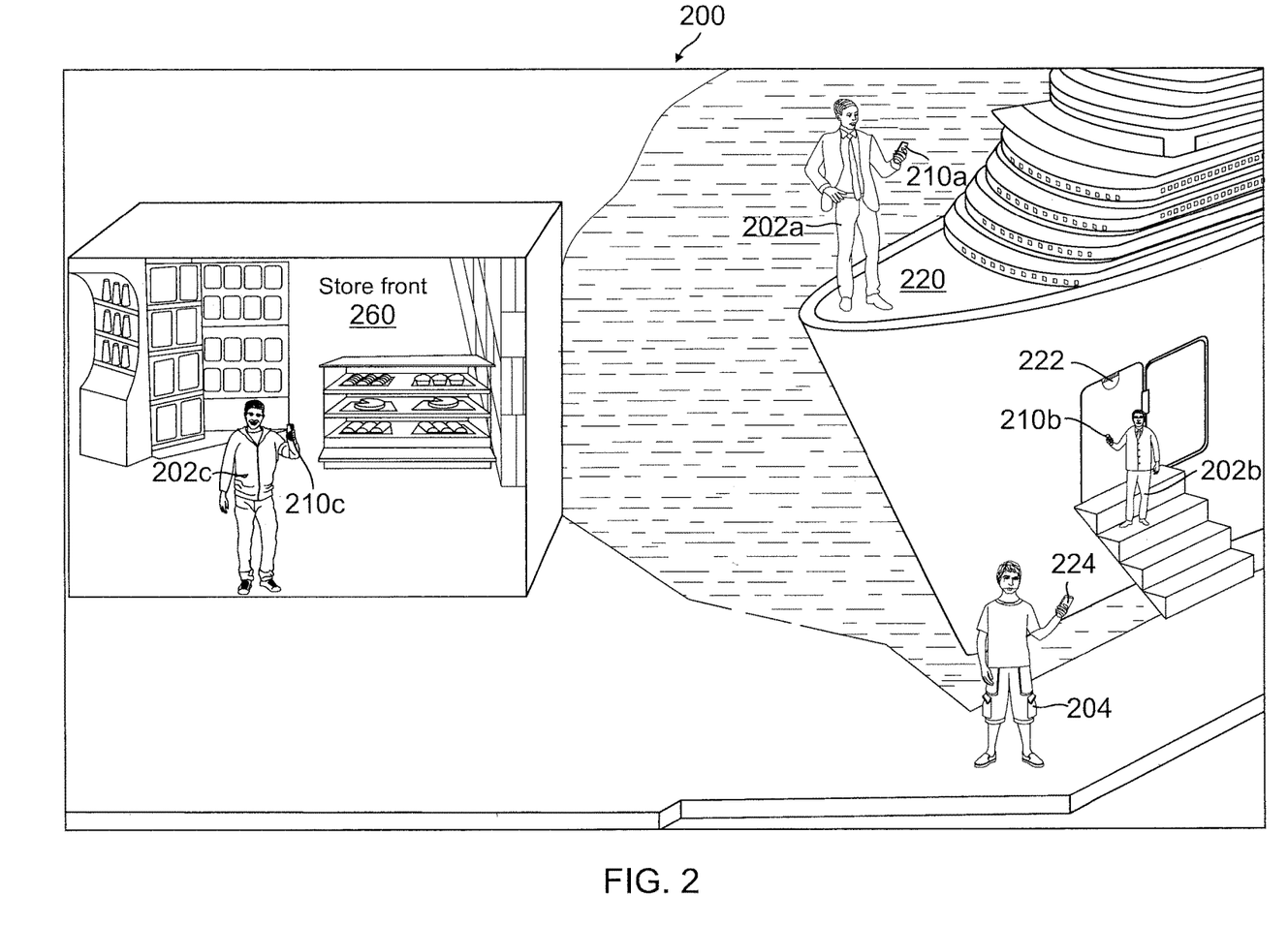
FIG. 2 is an exemplary environment having users being checked back in to a cruise ship after disembarking using a wireless beacon, according to an embodiment.

FIG. 2 is an exemplary environment having users being checked back in to a cruise ship after disembarking using a wireless beacon, according to an embodiment. Environment 200 of FIG. 2 includes a user 202a having a communication device 210a, a user 202b having a communication device 210b, and a user 202c having a communication device 210c all corresponding generally to user 102 and communication device 110, respectively, of FIG. 1. Environment 200 also includes a vehicle 220 including a wireless beacon 222 corresponding to vehicle 120 including wireless beacon 122, respectively, of FIG. 1. Additionally, environment 200 includes an operator device 224 corresponding generally to operator device 124 of FIG. 1.

In environment 200, users 202a-c may have arranged travel on vehicle 220, such as a cruise ship. Vehicle 220 is shown as docked at a location in environment 200 where one or more of users 202a-c may have left vehicle 220 to visit storefront 260. However, when vehicle 220 is scheduled to depart from the location in environment 200, an operator 204 may be required to account for all passengers on vehicle 220. Thus, operator 204 may want to know the locations of users 202a-c, and specifically whether users 202a-c are located on vehicle 220. Operator 204 may the utilize connection information for wireless beacon 222 to determine whether users 202a-c are located on vehicle 220.

For example, user 202a may have re-entered vehicle 220 after visiting storefront 260. In other embodiments, user 202a may have not exited vehicle 220. Thus, wireless beacon 222 may connect with communication device 210a while user 202a is in proximity to wireless beacon 222 (e.g., on and/or within vehicle 220). The connection may supply an identifier for user 202a and/or communication device 210a to wireless beacon 222 for use in identifying user 202a as located on/within vehicle 220 based on the connection. Wireless beacon 222's connection information may include the connection between communication device 210a and wireless beacon 222. Thus, a device managing vehicle 220 may determine user 202a is located on vehicle 220. Operator 204 may be updated of user 202a's location on vehicle 220 through operator device 224 by the device managing vehicle 220.

Similarly, user 202b is re-entering vehicle 220 after visiting storefront 260. As user 202b passes through an entrance to vehicle 220, communication device 210b may come into proximity to wireless beacon 222. Once communication device 210b and wireless beacon 222 connect, connection information for wireless beacon 222 may include the connection between communication device 210b and wireless beacon 222. Thus, the device managing vehicle 220 may determine that user 202b is similarly on, within, or nearby vehicle 220 and ready for departure. Thus, if user 202b has been missing from vehicle 220 (e.g., included within a missing passenger list provided to operator 20 on operator device 224), operator 204 may be updated that user 202b has re-entered vehicle 220 and is ready for departure.

However, in environment 200, user 202c is seen as still remote from vehicle 220 and located in storefront 260. While user 202c is remote from vehicle 220, communication device 210c and wireless beacon 222 will not connect based on the range limitations of wireless beacon 222 (e.g., set to only connect to devices on, within, and/or nearby vehicle 220). Thus, connection information for wireless beacon 222 would not include a connection between communication device 210c and wireless beacon 222. In such embodiments, the device managing vehicle 220 may determine that user 202c is absent from vehicle 220. Thus, the device may determine a missing passengers list with at least user 202c, and communicate the list to operator device 224 to inform operator 204 that user 202c is missing and/or to stop departure of vehicle 220. Additionally, either the device or operator 204 may attempt to contact user 202c on communication device 210c using contact information for user 202c.

Figure 3:
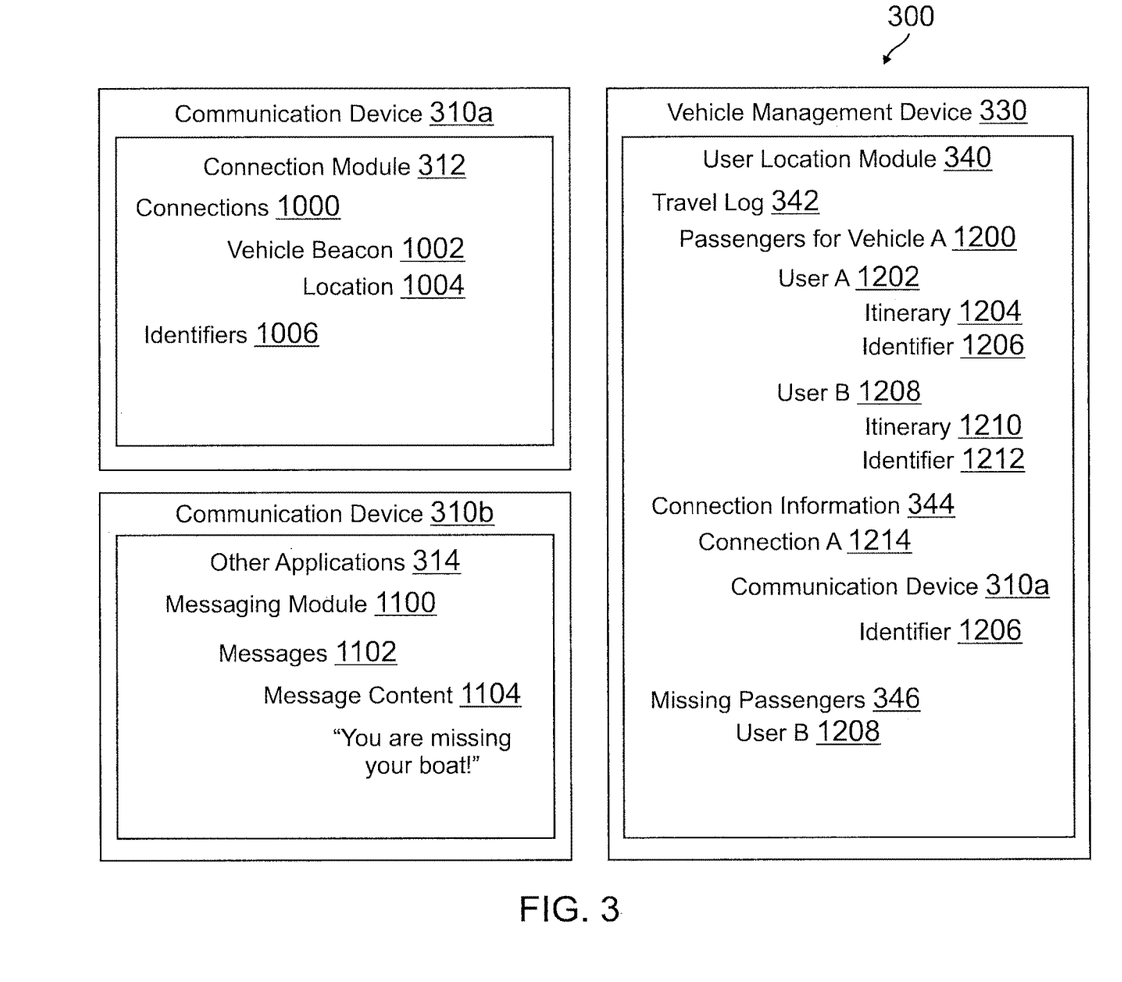
FIG. 3 is an exemplary system environment having two communication devices used to determine whether their respective users have returned to a vehicle through wireless beacon communications, according to an embodiment.

FIG. 3 is an exemplary system environment having two communication devices used to determine whether their respective users have returned to a vehicle through wireless beacon communications, according to an embodiment. Environment 300 of FIG. 3 includes a communication device 310a and a communication device 310b both corresponding to communication device 110 of FIG. 1. Additionally, environment 300 includes a vehicle management device 330 corresponding generally to vehicle management device 130, respectively, of FIG. 1.

Communication device 310a executes a connection module 312 corresponding generally to the specialized hardware and/or software modules and processes described in reference to connection module 112 of FIG. 1. In this regard, connection module 312 may be utilized to connect with a wireless beacon (not shown) for a vehicle (not shown) for vehicle management device 330. Thus, connection module 312 includes connections 1000, which may include current connections for communication device 310a with a wireless beacon, as well as past connection information. Connections 1000 include vehicle beacon 1002, which may correspond to a wireless beacon associated with a vehicle that the user (not shown) of communication device 310c is currently located on, within, or nearby. Vehicle beacon 1002 also includes a location 1004, which may be utilized to inform the user of the current location for the vehicle and/or vehicle beacon 1004. Connection module 312 may further include identifiers 1006, which may be used when establishing the connection with vehicle beacon 1002.

Vehicle management device 330 executes a user location module 340 corresponding generally to the specialized hardware and/or software modules and processes described in reference to user location module 340 of FIG. 1. In this regard, user location module 340 may be utilized to determine if all users are located on, within, and/or nearby a vehicle and/or whether the vehicle is ready for departure. Thus, user location module 340 includes a travel log 342, connection information 344, and missing passengers 346. Travel log 342 may be established by a travel management module and may include passengers, locations, and other travel information for the vehicle associated with vehicle management device 330. Travel log 342 includes passengers for vehicle A 1200 having user A 1202 and user B 1208. User A 1202 includes at least an itinerary 1204 for user A 1202 and an identifier 1206 allowing a wireless beacon and/or user location module 340 to identify user A 1202. Similarly, user B 1208 includes an itinerary 1210 and an identifier 1212.

User location module 340 may access travel log 342 for processing with connection information 344. Connection information 344 includes connection information for a wireless beacon associated with a vehicle managed by vehicle management device 330. Connection information 344 includes all connections made by the wireless beacon with communication devices. Thus, connection information 344 includes connection A 1214 having a connection between the wireless beacon and communication device 310a. In addition, communication device 310a may have supplied an identifier 1206 for use in connection information 344. However, user location module 340 may still be unaccounted for communication device 310b in connection information 344. Thus, user location module 340 may determine missing passengers 346 having a list of missing passengers from travel log 342. Thus, missing passengers 346 include user B 1208. User B 1208 may correspond to communication device 310b, and may be contacted through contact information provided vehicle management device 330 and communication device 310b.

Thus, communication device 310b executes other applications 314 corresponding generally to the specialized hardware and/or software described in reference to other applications 114 of FIG. 1. In this regard, other applications 314 may include a communication application, such as a text, email, or messaging application, configured to receive communications from vehicle management device 330 and/or an operator device for an operator of the vehicle associated with vehicle management device 330. Other applications 314 include a messaging module 1100 that may include the aforementioned messages, alerts, and/or notifications. For example, messaging module 1100 includes messages 1102 alerting the user (not shown) of communication device 310b (e.g., user B 1208) that the user is missing from the vehicle. Messages 1102 includes a message content 1104, such as, "You are missing your boat!" that alerts the user to return to the vehicle.

Figure 4:
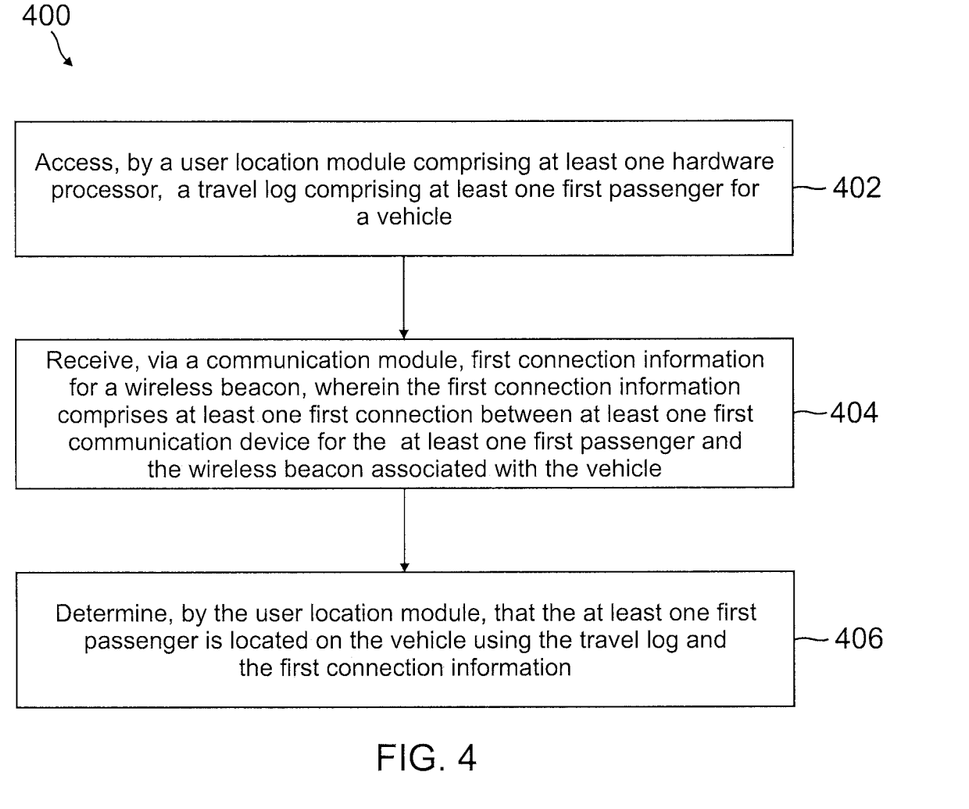
FIG. 4 is a flowchart of an exemplary process for wireless beacon devices for use in tracking user locations during group travel, according to an embodiment.

FIG. 4 is a flowchart of an exemplary process for wireless beacon devices for use in tracking user locations during group travel, according to an embodiment. Note that one or more steps, processes, and methods described herein may be omitted, performed in a different sequence, or combined as desired or appropriate.

At step 402, first connection information is received, via a communication module, for a wireless beacon, wherein the first connection information comprises at least one first connection between at least one first communication device for the at least one first passenger and the wireless beacon associated with the vehicle. The at least one first connection may use one of near field communication, radio communication, infrared communication, Bluetooth communication, Bluetooth Low Energy (BLE) communication, WiFi communication, and LTE Direct communication. The at least one first connection may comprise an identifier for at least one of the at least one first communication device and the at least one first passenger. The vehicle may comprise one of a bus, a subway, a train, a boat, a cruise ship, an airplane, and a limousine A travel log comprising the at least one first passenger for the vehicle is accessed, by a user location module comprising at least one hardware processor, at step 404. Thus, at step 406, it is determined, by the user location module, that the at least one first passenger is located on the vehicle using the travel log and the first connection information. The at least one first passenger may comprise all of the passengers in the travel log. Thus, a notification may be generated that all of the passengers are located on the vehicle and communicated to a device for an operator of the vehicle. The device may comprise one of a center console computing unit, a heads up display, a tablet computer, a wearable computing device, and a centralized vehicle computing device.

In other embodiments, the travel log may further comprise at least one second passenger for the vehicle. Thus, user location module may further determine the at least one second passenger is not located on the vehicle using the travel log and the first connection information, wherein the first connection information does not include at least one second connection between at least one second communication device for the at least one second passenger and the wireless beacon associated with the vehicle. A missing passenger list may be determined that comprises the at least one second passenger not located on the vehicle and communicated to the device for the operator of the vehicle. Later, second connection information for the wireless beacon comprising the at least one second connection between the at least one second communication device for the at least one second passenger and the wireless beacon associated with the vehicle may be received. In such embodiments, the user location module may update the missing passenger list to remove the at least one second passenger. However, the missing passenger list may further comprise at least one third passenger not located on the vehicle. Thus, the at least one third passenger missing from the vehicle may be communicated to the device of the operator to inform the operator of the at least one third passenger not located on the vehicle.

The user location module may further determine contact information for the at least one second user not located on the vehicle. The contact information may be communicated to the device for the operator of the vehicle. An alert comprising a time or notification of departure of the vehicle may be generated and communicated to the at least one second user using the contact information. The alert may comprise one of an SMS or MMS text message to a phone number in the contact information, an email to an email address in the contact information, a message to a messenger account in the contact information, and a phone call to the phone number. Furthermore, at least one of an emergency contact associated with the at least second passenger, an authority department contact, a vehicle security officer contact, and a co-passenger contact associated with the at least second passenger may be accessed and alerted that the second passenger is not located on the vehicle. Additionally, an itinerary for the at least one second passenger may be accessed, and it may be determined whether the at least one second passenger is continuing to travel on the vehicle using the itinerary.

Figure 5:
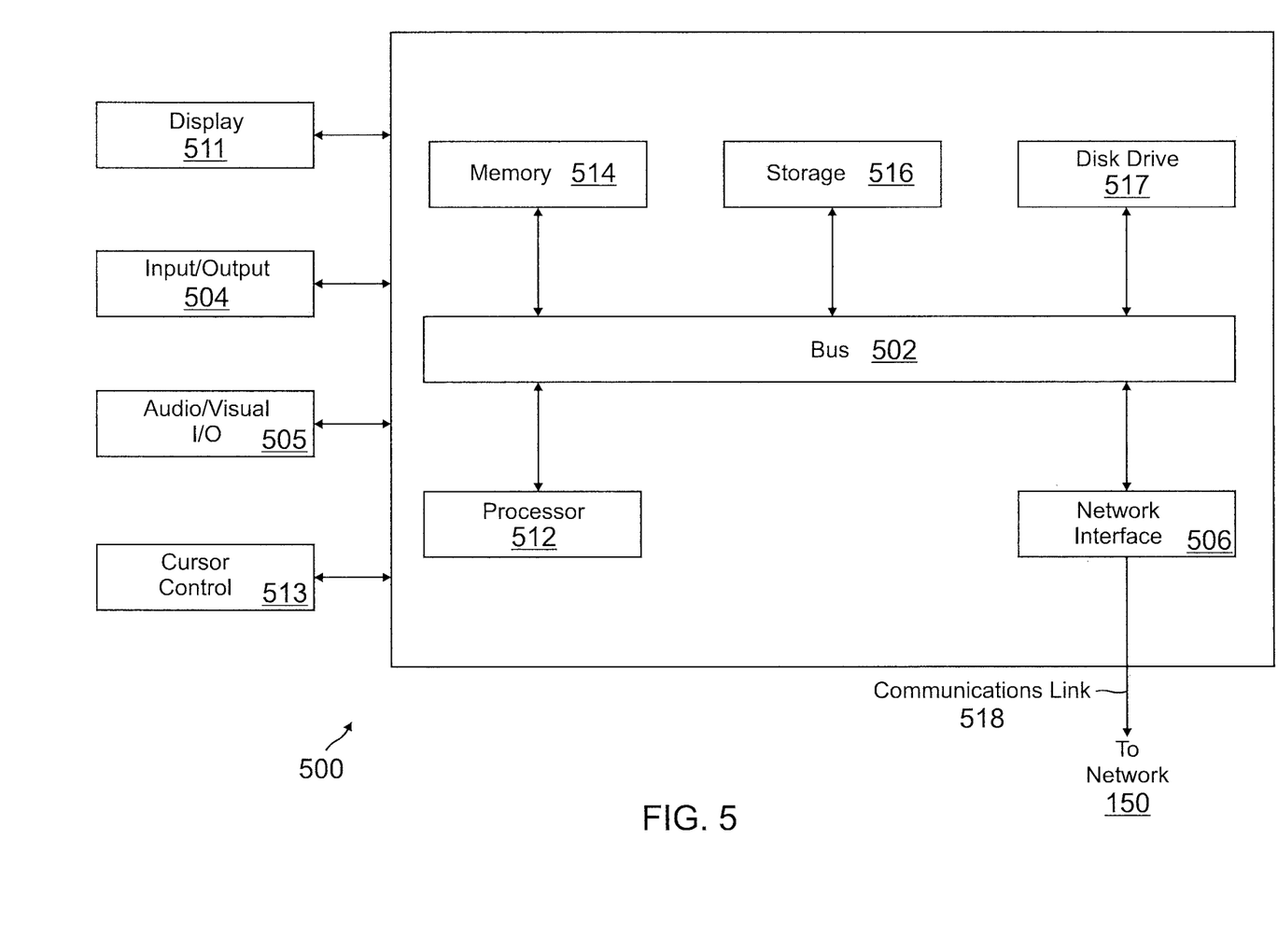
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer-implemented method comprising:
    communicating, from a first device associated with a user, identification information associated with the user to a second device associated with a vehicle;
    receiving, from the second device, information indicating that the vehicle is a wrong vehicle for the user; and
    outputting, on a display of the first device, an alert indicating that the vehicle is the wrong vehicle for the user.

2. The computer-implemented method of claim 1, wherein the second device comprises a server.

3. The computer-implemented method of claim 1, wherein the second device is located within the vehicle.

4. The computer-implemented method of claim 3, wherein the second device is associated with a driver of the vehicle.

5. The computer-implemented method of claim 3, wherein the communicating the identification information associated with the user to the second device associated with the vehicle causes the second device to output, on an additional display of the second device, an additional alert indicating that the vehicle is the wrong vehicle for the user.

6. The computer-implemented method of claim 1, wherein the communicating the identification information occurs responsive to the first device forming a wireless connection with the second device.

7. The computer-implemented method of claim 1, wherein the communicating the identification information occurs when the first device is near or within the vehicle.

8. A computer-implemented method comprising:
    receiving, at a first device associated with a vehicle, identification information associated with a user, the identification information received from a second device of the user;
    comparing the identification information associated with the user to a travel log of the vehicle, the travel log including identification information for one or more passengers that should be travelling on the vehicle;
    based on the comparing, determining that the vehicle is a wrong vehicle for the user; and
    communicating, to the second device, information indicating that the vehicle is a wrong vehicle for the user.

9. The computer-implemented method of claim 8, wherein communicating the information causes an alert indicating that the vehicle is the wrong vehicle for the user to be output on a display of the second device.

10. The computer-implemented method of claim 8, wherein the first device comprises a server.

11. The computer-implemented method of claim 8, wherein the first device comprises a server.

12. The computer-implemented method of claim 8, wherein first device is located within the vehicle.

13. The computer-implemented method of claim 12, wherein the first device is associated with a driver of the vehicle.

14. The computer-implemented of claim 12, further comprising outputting, on an additional display of the first device, an additional alert indicating that the vehicle is the wrong vehicle for the user.

15. The computer-implemented method of claim 8, wherein the identification information associated with the user is received from the second device when the second device is near or within the vehicle.

16. A non-transitory computer-readable medium comprising executable modules which, in response to execution by a computer system, cause the computer system to perform operations comprising:
    communicating, from a first device associated with a user, identification information associated with the user to a second device associated with a vehicle;
    receiving, from the second device, information indicating that the vehicle is a wrong vehicle for the user; and
    outputting, on a display of the first device, an alert indicating that the vehicle is the wrong vehicle for the user.

17. The non-transitory computer-readable medium of claim 16, wherein the second device comprises a server.

18. The non-transitory computer-readable medium of claim 16, wherein the second device is located within the vehicle.

19. The non-transitory computer-readable medium of claim 18, wherein the second device is associated with a driver of the vehicle.

20. The non-transitory computer-readable medium of claim 18, wherein the communicating the identification information associated with the user to the second device associated with the vehicle causes the second device to output, on an additional display of the second device, an additional alert indicating that the vehicle is the wrong vehicle for the user.

* * * * *